Sept. 13, 1938.   J. G. SWAN   2,129,884
POWER TRANSMISSION SYSTEM
Filed Feb. 14, 1935

Inventor
James George Swan
per
Dean Fairbank Hirsch & Foster
his Attorneys

Patented Sept. 13, 1938

2,129,884

UNITED STATES PATENT OFFICE 2,129,884

POWER TRANSMISSION SYSTEM

James George Swan, London, England, assignor to Hydraulic Coupling Patents Limited, London, England, a company of Great Britain Application February 14, 1935, Serial No. 6,438
In Great Britain February 20, 1934

18 Claims. (Cl. 74—293)

The present invention relates to power transmission systems comprising a hydraulic coupling of the kinetic type having two co-axial vaned elements which are juxtaposed to form an annular hydraulic circuit for the coupling liquid.

It is known that, with such systems, under certain circumstances difficulty is experienced in preventing undesirably rapid variations of the torque transmitted. For example, in one known arrangement a hydraulic coupling of the type set forth is employed to couple to a continuously running driving machine a driven machine having a high inertia, the driven machine being started, accelerated and stopped by varying the quantity of liquid in the working circuit of the coupling. With such an arrangement it is difficult, unless the hydraulic circuit is modified in the manner described in British patent specifications Nos. 384,022 and 402,185, to secure a satisfactorily progressive acceleration, or to maintain a substantially uniform torque and speed of the driven machine at certain stages of filling and emptying of the coupling.

The difficulty in maintaining a progressive acceleration usually appears over a particular range of slip in the coupling when the liquid content is substantially less than the maximum. By the "slip" of a hydraulic coupling is meant the speed of the slower vaned coupling element expressed as a percentage of the speed of the faster vaned coupling element. It has been found, for example, that when the slip in the coupling is between 60 and 70 percent and when the degree of filling of the coupling has attained a critical value, the driven machine may be accelerated with such violence as to overload the driving machine. Furthermore, when the slip is within this range, the torque load often fluctuates rapidly and widely; this surging, which is apparently due to some cyclic instability as the circulation in the hydraulic circuit of the coupling may persist until the critical range of emptying or filling has been passed.

The object of the present invention is to provide an improved power transmission system in which these difficulties are obviated or reduced.

It has previously been proposed to employ a hydraulic coupling of the kinetic type and of the kind in which the liquid content of the working circuit cannot be varied to any substantial extent during the operation of the coupling, in combination with a planetary gear, so arranged that the two elements of the hydraulic coupling are fixed respectively to two elements of the planetary gear, while the third element of the planetary gear is fixed to the driving (or driven) shaft of the system, the driven (or driving) shaft of the system being fixed to one of the hydraulic coupling elements.

I have discovered that if in such an arrangement a coupling of the type that can be emptied and filled during operation is substituted for the constant filling type previously proposed, the difficulties hereinbefore referred to, in the operation of such variable-filling couplings, can be overcome, or largely reduced, provided that the various elements are combined in particular ways.

According to the present invention a power transmission system comprises, in combination, a driving shaft, a driven shaft, a hydraulic coupling having two rotatable vaned elements one of which is coupled to said driving shaft for rotation therewith, means for substantially emptying and filling the hydraulic circuit of said coupling while said driving shaft is rotating, and a planetary gear train two elements of which are adapted to rotate with said coupling elements respectively and the third element of which is coupled to said driven shaft for rotation therewith, the arrangement being such that, when power is being transmitted from said driving shaft to said driven shaft, the hydraulic coupling element that is not coupled for rotation with said driving shaft is caused to rotate in the same direction as said driving shaft irrespective of the speed of rotation of said driven shaft.

The arrangement may be such that, when power is being transmitted from the driving shaft to the driven shaft, the hydraulic coupling element not coupled for rotation with the driving shaft rotates faster than the driving shaft. In another construction, under the same conditions, the last-mentioned hydraulic coupling element rotates slower than the driving shaft.

The ratios of the planetary gear should be such that, when the driving shaft is rotating and the driven shaft is stalled, the slip in the hydraulic coupling will not be so high as to come within the critical range over which the torque surging, hereinbefore referred to, is liable to occur during filling and emptying of the coupling circuit. The actual ratios best suited to a particular case depend on a number of factors, including the inertia of the load and the maximum rate of acceleration desired. Generally, however, it is necessary that the slip in the hydraulic coupling should not be more than 50 per cent. when the driven shaft is stalled, that is to say the slower coupling element should rotate at a speed of not less than half that of the faster coupling element. In some cases it is desirable to arrange the gearing so that the slip in the coupling can never exceed about 40 per cent.

The invention will be further described with reference to the accompanying diagrammatic drawing in which Fig. 1 is a sectional side elevation, taken on the line 1—1 in Fig. 2, of part of a form of the improved power transmission mechanism which enables a wide choice of ratios of the planetary gearing to be secured.

Figures 1, 2:
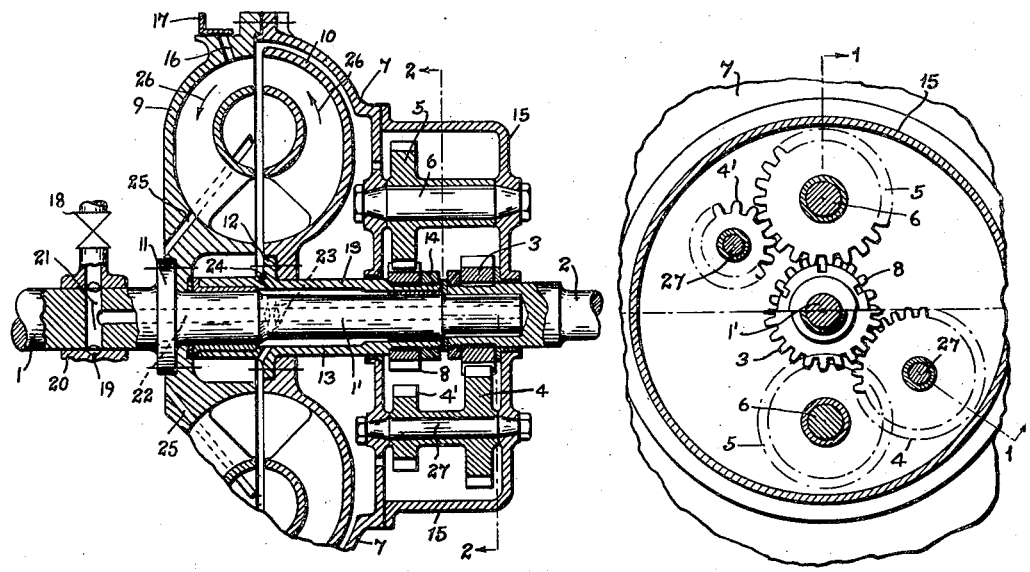
Fig. 2 is a sectional end elevation taken on the line 2—2 in Fig. 1.

Referring to Figs. 1 and 2, one vaned element 9 of the hydraulic coupling is coupled to a driving shaft 1 by means of bolts (not shown) engaging in a flange 11 formed on this shaft. The vaned element 9 is juxtaposed to a vaned element 10 fixed by bolts (not shown) to a flange 12 formed on a hollow shaft 13 journalled on an extension 1' of the driving shaft. A toothed sun wheel 8 is keyed to the hollow shaft 13, being retained by a nut 14. A member 7 is fixed at its periphery to the element 9 of the hydraulic coupling and forms a casing rotating with the driving shaft and covering the back of the element 10. The member 7 also serves as a planet carrier element of the planetary gear; to it are secured two diametrically opposed pins 6 on each of which is journalled a toothed planet wheel 5 meshing with the sun wheel 8. To the planet carrier 7 are also secured two diametrically opposed pins 27 on each of which is journalled a toothed pinion 4' integral with a planet wheel 4 and meshing with one of the planet wheels 5. To a driven shaft 2 is fixed a sun wheel 3 meshing with the planet wheels 4. A shell 15, fixed to the member 7 and to the pins 6 and 27, encloses the planetary gear and assists in supporting these pins.

Ports 16 in the radially outer part of the element 9 are controlled by an axially slidable ring valve 17 which is adapted to be moved by a suitable control in known manner to open and close the ports. When the ports are open, liquid can drain from the coupling, under the influence of centrifugal force, until the hydraulic circuit is empty or substantially so, that is, until insufficient liquid remains in the circuit to maintain the transmission of appreciable torque between the elements 9 and 10. Liquid can be admitted to the working circuit of the coupling under control of a valve 18 in a duct leading to an annular channel 19 in a manifold 20 surrounding the shaft 1. Radial ports 21 in the shaft 1 register with the channel 19 and communicate with an axial bore 22 which in turn communicates with radial ports 23 opening into the interior of the hollow shaft 13. Ports 24 in the shaft 13 allow the incoming liquid to reach the space between the elements 9 and 10 and thereby to enter the hydraulic circuit. Air vents 25 may be provided to assist in rapid emptying and filling of the coupling.

When the driving shaft 1 and with it the coupling element 9 are rotating and the driven shaft 2 is held stationary by the load (the hydraulic coupling being substantially empty), the sun wheel 3 is stationary and the planet wheels 4 are rolled round this sun wheel by the action of the planet carrier 7 which rotates with the coupling element 9. Consequently the sun wheel 8 and the coupling element 10 are driven (through the pinions 4' and the planet wheels 5) at a higher speed than, and in the same direction as the driving shaft. When liquid is admitted to the hydraulic circuit of the coupling, it circulates in the direction of the arrows 26.

The circulation in the hydraulic coupling tends to equalize the speeds of the elements 9 and 10; consequently the speed of the coupling element 10 falls and the driven shaft 2 accelerates as soon as the torque transmitted by the coupling is high enough to overcome the resistance imposed by the load. When the coupling is substantially full and the driven shaft is running at its maximum speed, this shaft rotates slightly slower than the driving shaft, while the coupling element 10 rotates in the same direction as and slightly faster than the driving shaft.

In the example shown in Figs. 1 and 2, the wheels have the following numbers of teeth: sun wheel 8, 20 teeth; planets 5, 27 teeth; planets 4', 16 teeth; planets 4, 25 teeth; and sun wheel 3, 22 teeth. Consequently, when the driven shaft is stalled, the coupling element 9 rotates at 59 per cent. of the speed of the coupling element 10. Thus the maximum slip in the hydraulic coupling is 41 per cent.

Figure 3:
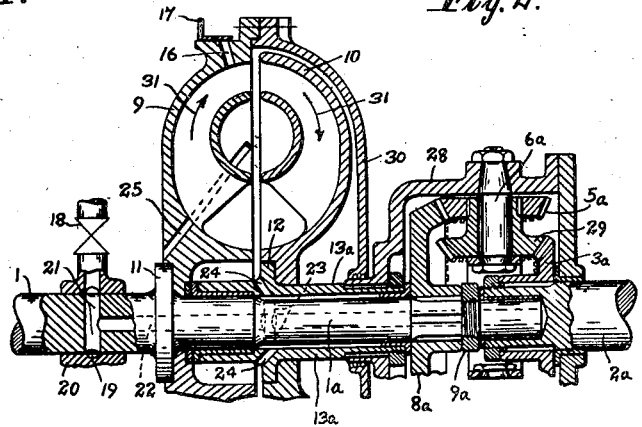
Fig. 3 is a sectional side elevation of part of an arrangement in which the maximum slip in the hydraulic coupling is about 40 per cent.

The alternative transmission system shown in Fig. 3 is in some respects similar to that shown in Figs. 1 and 2, similar parts in the two examples being denoted by the same reference numerals. In the arrangement shown in Fig. 3 a compound bevel planetary gear is used. The sun wheel 8a of the planetary gear is keyed to an extension 1a of the driving shaft 1, being retained by a nut 9a. The driven coupling element 10 is fixed to a hollow shaft 13a, which is journalled on the shaft 1a. The hollow shaft 13a is keyed to a planet carrier 28 carrying a plurality of uniformly spaced pins 6a on each of which are journalled a pair of planet pinions 5a and 29 which are fixed together. All the pinions 29 engage with a sun wheel 3a keyed to a driven shaft 2a. The pinions 5a and 29 are of approximately the same diameter, while the sun wheel 3a is smaller than the sun wheel 8a, the difference in size of these wheels being largely a matter of convenience in design. A rotatable cover member 30 is fixed to the coupling element 9 and encloses the back of the element 10.

When the driving shaft 1 and with it the coupling element 9 are rotating and the driven shaft 2a is held stationary by the load (the coupling being substantially empty) the sun wheel 3a is stationary, and the planet pinions 29 are rolled round this sun wheel by the action of the sun wheel 8a which rotates with the coupling element 9 and is engaged with the planet gear clusters. Consequently the planet carrier 28 and the coupling element 10 are driven at a lower speed than, and in the same direction as, the driving shaft 1. When liquid is admitted to the hydraulic circuit of the coupling it circulates in the direction of the arrows 31. As soon as the torque transmitted by the coupling is high enough to overcome the resistance imposed by the load, the speed of the coupling element 10 rises and the driven shaft 2a accelerates. When the driven shaft is running at its maximum speed, the hydraulic coupling being substantially full, the driven shaft and the coupling element 10 rotate slightly slower than the driving shaft.

Figure 4:
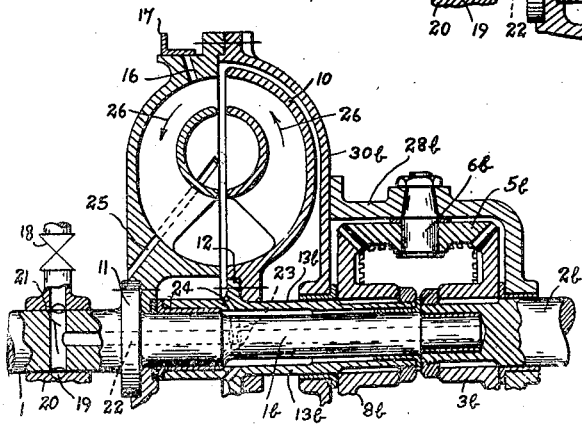
Fig. 4 is a sectional side elevation of part of a simple alternative construction in which the maximum slip is 50 per cent.

The arrangement shown in Fig. 4 is a modification of that shown in Figs. 1 and 2, having a simple bevel planetary gear. A planet carrier 28b is fixed to a cover member 30b which in turn is fixed to the coupling element 9 that rotates with the driving shaft. The coupling element 10 is fixed to a hollow shaft 13b to which is keyed a sun wheel 8b meshing with a plurality of planet pinions 5b each journalled on a pin 6b fixed to the planet carrier. These pinions mesh with a sun wheel 3b keyed to a driven shaft 2b.

With this arrangement, as with that in Figs. 1 and 2, the hydraulic coupling element 10 rotates faster than the coupling element 9. Owing to the nature of the planetary gear, however, the maximum slip in the hydraulic coupling is fixed at 50 per cent.

In arrangement shown in Fig. 3, the torque transmitted by the hydraulic elements exceeds the torque on the driving and driven shafts; thus the hydraulic coupling should be larger than a coupling used under corresponding conditions of torque, slip and speed and without associated planetary gearing.

In the arrangements shown in Figs. 1 and 2, and 4 on the other hand, the torque transmitted by the hydraulic elements is less than the torque on the driving and driven elements, so that the size of coupling can be correspondingly reduced.

I claim:

1. The combination of a driving shaft, a driven shaft, a hydraulic coupling having a rotatable vaned element coupled to said driving shaft for rotation therewith, a rotatable vaned element serving to transmit power to said driven shaft, said vaned elements cooperating to form an annular circuit for working liquid, and means operable for substantially emptying said circuit of and filling said circuit with working liquid while said driving shaft is rotating, so as to interrupt and reconnect the transmission of power between said shafts, and means for eliminating power surges due to operation of said first mentioned means, said second mentioned means comprising a planetary gear having three elements connected respectively for rotation with said vaned elements and said driven shaft, the ratios of said gearing being such that, when power is being transmitted from said driving shaft to said driven shaft, and said circuit is substantially full, said second mentioned vaned element is caused to rotate in the same direction as said driving shaft irrespective of the speed of rotation of said driven shaft, and when said circuit is substantially empty and said driven shaft is stalled, the slip between said vaned elements is less than 50 per cent.

2. Apparatus as claimed in claim 1, wherein the ratio of the gears of said planetary gear and the connections to the coupling is such that, when power is being transmitted from said driving shaft to said driven shaft, the vaned element that is not coupled for rotation with said driving shaft is caused to rotate faster than said driving shaft.

3. Apparatus as claimed in claim 1, wherein the ratio of the gears of said planetary gear and the connections to the coupling is such that, when power is being transmitted from said driving shaft to said driven shaft, the vaned element that is not coupled for rotation with said driving shaft is caused to rotate slower than said driving shaft.

4. Apparatus as claimed in claim 1, wherein the ratios of said planetary gear are such that, when said driven shaft is stalled and said driving shaft is rotating, one of said vaned elements rotates at a speed of not less than half of the speed of the other of said vaned elements.

5. Apparatus as claimed in claim 1, wherein the ratios of said planetary gear are such that, when said driven shaft is stalled and said driving shaft is rotating, one of said vaned elements rotates at a speed exceeding 50 per cent of the speed of the other of said vaned elements.

6. The combination of a driving shaft, a driven shaft, a hydraulic coupling having two rotatable vaned elements which together form an annular working circuit, one of said vaned elements being coupled to said driving shaft for rotation therewith, and a planetary gear having a driven sun wheel coupled for rotation with said driven shaft, a plurality of planet wheels which are drivably connected together and one of which meshes with said sun wheel, a planet carrier coupled for rotation with one of said vaned elements and a sun wheel coupled for rotation with the other of said vaned elements, said last-mentioned sun wheel meshing with one of said planet wheels which is not in mesh with said driven sun wheel, characterized in that there are provided means operable for substantially emptying and filling said circuit while said driving shaft is rotating, and that the ratios of said planetary gear are such that when said driving shaft is rotating and said driven shaft is stalled, said vaned elements are constrained to rotate in the same direction and the slip between said vaned elements is less than 60 per cent.

7. Apparatus as claimed in claim 6, wherein said planet carrier is coupled for rotation with said driving shaft.

8. A power transmission system comprising, in combination, a driving shaft, a driven shaft, a hydraulic coupling having two rotatable vaned elements juxtaposed to form an annular working circuit, one of said vaned elements being coupled to said driving shaft for rotation therewith, means for substantially emptying and filling said circuit while said driving shaft is rotating, and a planetary gear having a driven sun wheel coupled for rotation with said driven shaft, a sun wheel coupled for rotation with one of said vaned elements, a planet carrier coupled for rotation with the other of said vaned elements, two planet wheels journalled on said planet carrier, rotatable about different axes, parallel to the axis of said sun wheels, and meshing respectively with said sun wheels, said two planet wheels being drivably connected together so that they are constrained to rotate, relatively to said planet carrier, in opposite directions, and the ratios of said gearing being such that when said driving shaft is rotating and said driven shaft is stalled, the slip between said vaned elements is less than 60 per cent.

9. Apparatus as claimed in claim 8, wherein said planet carrier is coupled for rotation with said driving shaft.

10. Apparatus as claimed in claim 8, wherein the ratios of said planetary gear are such that, when said driven shaft is stalled and said driving shaft is rotating, one of said vaned elements rotates at a speed exceeding 50 per cent, but not exceeding 65 per cent of the speed of the other of said vaned elements.

11. Apparatus as claimed in claim 6, wherein said second-mentioned sun wheel is coupled for rotation with said driving shaft.

12. A power transmission system comprising, in combination, a driving shaft, a driven shaft, a hydraulic coupling having two rotatable vaned elements juxtaposed to form an annular working circuit, one of said vaned elements being coupled to said driving shaft for rotation therewith, means for substantially emptying and filling said circuit while said driving shaft is rotating, and a bevel wheel planetary gear having two sun wheels which are of different diameters and which mesh respectively with two planet pinions which rotate solidly with one another and which are journalled on a planet carrier, said sun wheels being coupled for rotation respectively with said driven shaft and one of said vaned elements, and said planet carrier being coupled for rotation with the other of said vaned elements, and the ratios of said gearing being such that when said driving shaft is rotating and said driven shaft is stalled, the slip between said vaned elements is less than 60 per cent.

13. Apparatus as claimed in claim 12, wherein the sun wheel coupled for rotation with one of said vaned elements is also coupled for rotation with said driving shaft.

14. Apparatus as claimed in claim 12, wherein the ratios of said planetary gear are such that, when said driven shaft is stalled and said driving shaft is rotating, one of said vaned elements rotates at a speed exceeding 50 per cent but not exceeding 65 per cent of the speed of the other of said vaned elements.

15. A power transmission system comprising, in combination, a driving shaft, a driven shaft, a hydraulic coupling having two rotatable vaned elements juxtaposed to form an annular working circuit, one of said vaned elements being coupled to said driving shaft for rotation therewith, means for substantially emptying and filling said circuit while said driving shaft is rotating, and a simple bevel planetary gear having two sun wheels which are of equal sizes and are coupled for rotation respectively with said driven shaft and one of said vaned elements, a planet pinion meshing with both of said sun wheels, and a planet carrier on which said pinion is journalled and which is coupled for rotation with the other of said vaned elements, and the ratios of said gearing being such that when said driving shaft is rotating and said driven shaft is stalled, the slip between said vaned elements is less than 60 per cent.

16. Apparatus as claimed in claim 15, wherein said planet carrier is coupled for rotation with said driving shaft.

17. In a power transmission system comprising a driving shaft, a driven shaft, a three-element differential gear having two sun-wheel elements and a planet carrier element including a plurality of planet wheels meshing with said sun wheels, one of said sun wheels being coupled for rotation with said driven shaft and one of the remaining elements of said gear being coupled for rotation with said driving shaft, a hydraulic coupling having two vaned elements juxtaposed to form an annular working circuit, one of said vaned elements being coupled for rotation with said driving shaft and the other of said vaned elements being coupled for rotation with the element of said gear that is not connected to either of said shafts, and means for varying the amount of liquid in said circuit while said coupling is operating, whereby said driven shaft may be readily stalled when the liquid circuit is substantially empty and full load may be transmitted when the coupling is substantially full, the ratios of said gearing being such that when said driven shaft is stalled one of said vaned elements rotates in the same direction as, and at a speed of between 45 and 65 per cent. of the speed of the other of said vaned elements.

18. The combination of a driving shaft, a driven shaft, a hydraulic coupling having two rotatable elements which together form an annular working circuit, one of said vaned elements being coupled to said driving shaft for rotation therewith, means operable for varying the liquid content of said circuit between substantially empty and substantially full while said driving shaft is rotating, whereby the other of said elements may be stalled or power may be transmitted, and a planetary gear having three elements, two of which are connected for rotation with said vaned elements respectively and the third of which is connected for rotation with said driven shaft, the ratios of said planetary gear being such that, when said driving shaft is rotating said circuit is substantially full and power is being transmitted to said driven shaft, the one of said vaned elements that is not coupled for rotation with said driving shaft is caused to rotate in the same direction as said driving shaft irrespective of the speed of rotation of said driven shaft, and when said circuit is substantially empty and said driven shaft is stalled, the slip between said vaned elements is less than 50 per cent.

JAMES GEORGE SWAN.